United States Patent [19]

Ohata

[11] Patent Number: 4,843,553
[45] Date of Patent: Jun. 27, 1989

[54] SPEED CONTROL SYSTEM FOR A VEHICLE

[75] Inventor: Akira Ohata, Mishima, Japan

[73] Assignee: Toyota Jidosha Kabushiki Kaisha, Toyota, Japan

[21] Appl. No.: 209,439

[22] Filed: Jun. 21, 1988

[30] Foreign Application Priority Data

Jul. 16, 1987 [JP] Japan .................................. 62-178117

[51] Int. Cl.$^4$ ............................................ B60K 31/00
[52] U.S. Cl. .............................. 364/426.04; 123/352; 180/179
[58] Field of Search ...................... 364/426.04, 431.07; 123/352; 180/176, 179

[56] References Cited

U.S. PATENT DOCUMENTS

| 4,086,888 | 5/1978 | Roberts | 180/176 |
| 4,492,195 | 1/1985 | Takahashi et al. | 123/339 |
| 4,771,848 | 9/1988 | Namba et al. | 364/426.04 |

FOREIGN PATENT DOCUMENTS

| 59-46353 | 3/1984 | Japan . |
| 59-120751 | 7/1984 | Japan . |
| 59-120752 | 7/1984 | Japan . |

OTHER PUBLICATIONS

Luenberger, David G., Introduction to Dynamic Systems: Theory, Models, and Applications, John Wiley & Sons, Inc., New York, 1979, pp.446-449, (Japanese translation).

*Primary Examiner*—Gary Chin
*Attorney, Agent, or Firm*—Cushman, Darby & Cushman

[57] ABSTRACT

A vehicle speed control system is provided to maintain the vehicle speed at a target value. The control system includes a target vehicle speed determining section, a section for calculating a driving torque necessary to drive the vehicle at the target vehicle speed, a section for calculating a target engine rotational speed and an engine load torque and a section for calculating a control amount for controlling an opening of the throttle valve of the engine. The driving torque calculating section and the control amount calculating section are designed based on linear control theory on physical models describing the behavior of the vehicle and the engine, respectively, thereby improving the responsiveness of the control system compared to conventional PID control. The design of the control system is characterized by separate sections which reduces designing labor and which facilitate standardization of every section.

8 Claims, 7 Drawing Sheets

SPEED CONTROL SYSTEM FOR A VEHICLE

FIELD OF THE INVENTION

The present invention relates to a speed control system which is installed in a vehicle for setting a vehicle speed according to the position of the accelerator pedal pressed by the driver and opening or closing the throttle valve for the internal combustion engine to achieve the set speed.

BACKGROUND OF THE INVENTION

A speed control system which allows the driver to operate the accelerator pedal less frequently has been heretofore proposed, for example, in Published Unexamined Japanese Utility Model Application No. 57-5932. In such systems, when the vehicle goes into a different terrain, e.g., when it starts to climb a hill after traveling a flat road, the control system makes it unnecessary for the driver to operate the accelerator for controlling the vehicle speed. For this purpose, the control system sets the vehicle speed according to the position of the accelerator pedal operated by the driver and controls the opening of the throttle valve for the internal combustion engine to attain the set speed.

This known speed control system controls the opening of the throttle valve according to the difference between the actual speed and the set speed. That is, the system relies on a PID control. However, for PID control, a delay is introduced in the response time of the control system and the control accuracy is low.

In an attempt to solve the foregoing problems, the present inventor has tried to apply a linear control theory to the aforementioned speed control system for improving the responsiveness of the control system and for stabilizing the control accuracy. This method of design consists in finding a physical model describing the behavior of the controlled system, in this case the whole vehicle including the internal combustion engine, and determining a control law based on the model. However, if the speed control system is designed by this method of design, then the whole control system must be redesigned whenever a part of the driving system of the vehicle, such as the engine or the transmission, is modified. Thus, the design work is cumbersome to perform. As an example, for a second vehicle that has the same engine as the engine of a first vehicle but is equipped with a different power train, a new control law applying to the power train as well as to the engine must be determined. In other words, the same control law is not applicable to different vehicles even when they are equipped with the same engine.

Another method of design is known for the case where the linear control theory is applied to a controlled system, such as a vehicle, for which a linear relationship does not hold between the control input, or the throttle opening, and the control output, or the vehicle speed, as encountered where the vehicle speed is controlled. In this method, the operating state of the vehicle is divided into several regions in each of which a linear relation holds between the control input and the control output. A physical model is found and a control law is determined for every region. Whenever the vehicle enters a different region, the control law is switched to another. Therefore, when the speed control system is designed by this method of design, a control law must be set for every region of the vehicle operating state. However, when the speed is actually controlled, the control operation becomes complex because the control law must be switched.

SUMMARY OF THE INVENTION

Accordingly, it is an object of the invention to provide a speed control system which may be installed in a vehicle, has an improved control accuracy by the application of the linear control theory, is simple to design, and makes it unnecessary to switch the control law to another control law whenever the vehicle enters a different region.

The above object is achieved in accordance with the teachings of the invention by a speed control system for a vehicle having an internal combustion engine whose output power is adjusted by a throttle valve and is transmitted via a transmission to a driving wheel in order to control the vehicle speed, the control system comprising: target speed determination means for determining a target vehicle speed based on at least a command from a driver of the vehicle; first calculation means responsive to an actual vehicle speed and the target vehicle speed for calculating a driving torque at an output side of the transmission necessary to bring the actual vehicle speed to the target vehicle speed utilizing predetermined first parameters, the first parameters being determined based on a first physical model describing the behavior of the vehicle utilizing the vehicle speed as a state variable; second calculation means responsive to the driving torque, the target vehicle speed and a gear position of the transmission for calculating a target rotational speed and a load torque of the engine; control amount calculation means responsive to the target rotational speed, the load torque, an actual rotational speed of the engine and an intake air pressure of the engine for calculating a control amount of the throttle valve necessary to bring the actual rotational speed to the target rotational speed utilizing predetermined second parameters, the second parameters being determined based on a second physical model describing the behavior of the engine utilizing a rotational speed and an intake air pressure as state variables; and throttle driving means responsive to the control amount for driving the throttle valve of the internal combustion engine.

DETAILED DESCRIPTION OF THE INVENTION

Figure 1:
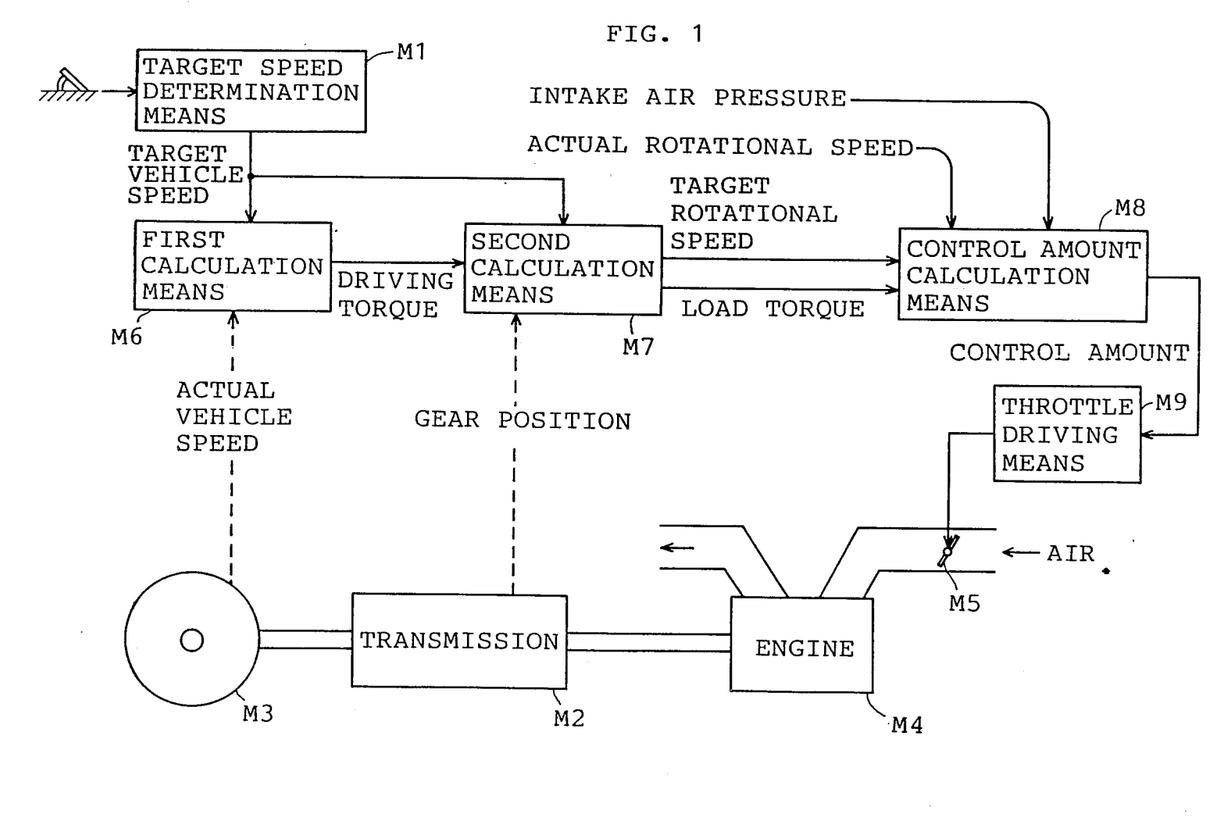
FIG. 1 is a conceptual representation of a speed control system according to the invention.

The theory underlying the inventive concept is first described by referring to FIG. 1. As shown, the speed control system according to the invention includes target speed determination means M1. This means M1 sets a target vehicle speed according to the distance moved by the accelerator pedal which is operated by the driver. The target vehicle speed also varies depending on other factors. Then, first calculation means M6 calculates the driving torque that the transmission M2 must deliver to achieve the set target speed. The torque is transmitted to the driving wheels M3.

Second calculation means M7 calculates the torque imposed on the internal combustion engine M4 and a target engine speed from the target speed set by the target speed determination means M1, the torque calculated by the first calculation means M6, and the gear position of the transmission M2.

Then, control amount calculation means M8 calculates the control amount by which the throttle valve M5 should be opened or closed to bring the speed of the engine M4 to the target speed, the control amount being determined from the target speed of the engine and the load torque calculated by the second calculation means M7, the actual speed of the engine M4, and the intake pressure. Throttle driving means M9 opens or closes the throttle valve M5 according to the control amount from the calculation means M8.

That is, the speed control device according to the invention comprises (1) a first system for obtaining such a driving torque from the transmission M2 which is needed to accomplish the target vehicle speed, (2) a second control system for finding the target speed of the engine M4 and the torque imposed on it from the obtained driving torque, and (3) a third control system for finding the control amount by which the throttle valve M5 should be opened or closed from the found target speed and the load torque. The first control system depends on the characteristics of the vehicle. The second control system depends on the power transmission characteristics of the power train for transmitting power from the engine M4 to the wheels M3. The third control system depends on the characteristics of the engine M4. Thus, with respect to the first control system, a control law is determined according to a physical model describing the behavior of the vehicle, whereas with respect to the third control system, a control law is determined according to a physical model representing the behavior of the engine.

Therefore, the linear control theory may be utilized in controlling the vehicle speed. This enhances the responsiveness of the control system to thereby improve the control accuracy. Furthermore, the aforementioned control systems can be separately designed.

As can be understood from the description made thus far, the novel speed control system of the present invention yields a much higher control accuracy than a speed control system relying on the conventional PID control. Also, the speed control system does not merely arise from the application of the linear control theory. Moreover, since the three control systems are separately designed, it is easy to design the whole speed control system. In addition, these three control systems can be standardized.

The torque imposed on the engine is applied to the control system for the engine, i.e., the control amount calculation means M8, as its control input. Thus, a feedforward control operation is effected according to the load torque. Therefore, the responsiveness of the control system can be improved further. Furthermore, the control systems for the engine and for the vehicle can be realized with only one control law, for these control systems are designed around physical models describing the behavior of the engine and the vehicle, respectively. Consequently, the control program can be simplified.

DETAILED DESCRIPTION OF THE PREFERRED EMBODIMENT

Figure 2:
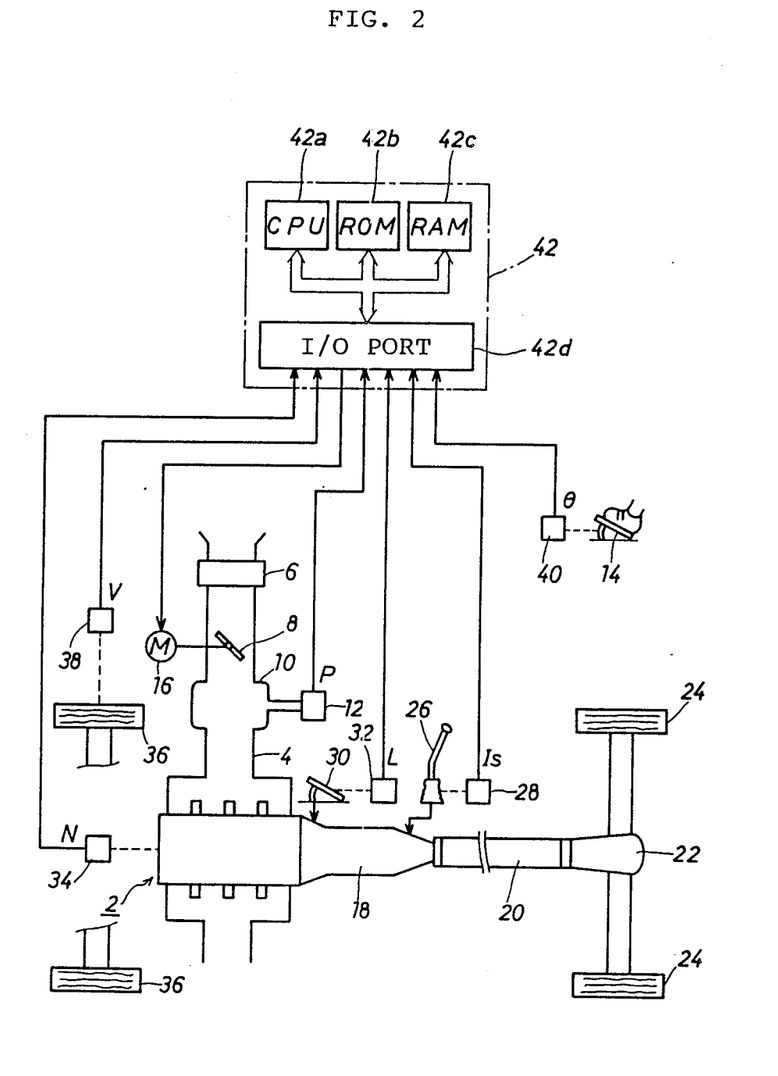
FIG. 2 is a schematic diagram of a speed control system according to an embodiment of the invention.

Referring next to FIG. 2, a vehicle equipped with a speed control system according to the invention is schematically shown. The vehicle has an internal combustion engine 2 including an inlet pipe 4. A throttle valve 8 for controlling the flow of air admitted into the pipe 4 through an air cleaner 6, a surge tank 10 for suppressing pulsation of the admitted air, and a sensor 12 for detecting the pressure inside the inlet pipe 4 are mounted in the pipe 4. The throttle valve 8 is not interlocked with the accelerator pedal 14 and is opened or closed by means of a stepper motor 16.

Rotary motion is transmitted from the engine 2 to right and left driving wheels 24 via a transmission 18, a propeller shaft 20, and a differential gear 22. In this specific example, the transmission 18 is a manual transmission to which a shift lever 26 is connected. The gear position Is of the transmission 18 which is selected by operating the shift lever 26 is detected by a gear position sensor 28. A clutch sensor 32 is also provided to detect the distance L moved by the clutch pedal 30, for sensing whether the clutch of the transmission 18 is engaged or disengaged.

The vehicle is further equipped with an engine speed sensor 34 for detecting the rotational speed N of the engine 2, a vehicle speed sensor 38 for determining the velocity V of the vehicle from the rotation of the left and right non-driving wheels 36, and an accelerator sensor 40 for detecting the distance $\theta$ moved by the accelerator pedal 14.

The output signals from the sensors 34, 38 and 40 are fed to an electronic controller 42 which causes the stepper motor 16 to open or close the throttle valve 8 so that the vehicle velocity V may coincide with a target velocity Vr. This target velocity is determined from the distance $\theta$ moved by the accelerator pedal 14 and also on the gear position Is of the transmission 18.

The electronic controller 42 is a known arithmetic logic unit and it comprises a CPU 42a, a ROM 42b, a RAM 42c, and input/output ports 42d. The CPU 42a performs arithmetic operations needed to control the vehicle speed, in accordance with a preset control program. This control program and initial data are stored in the ROM 42b. Data used for the arithmetic operations carried out by the CPU 42a is temporarily stored in the RAM 42c. The output signals from the sensors are input to the ports 42d, and depending on the results of calculations performed by the CPU 42a, a driving signal is supplied to stepper motor 16 from the ports 42d.

Figure 3:
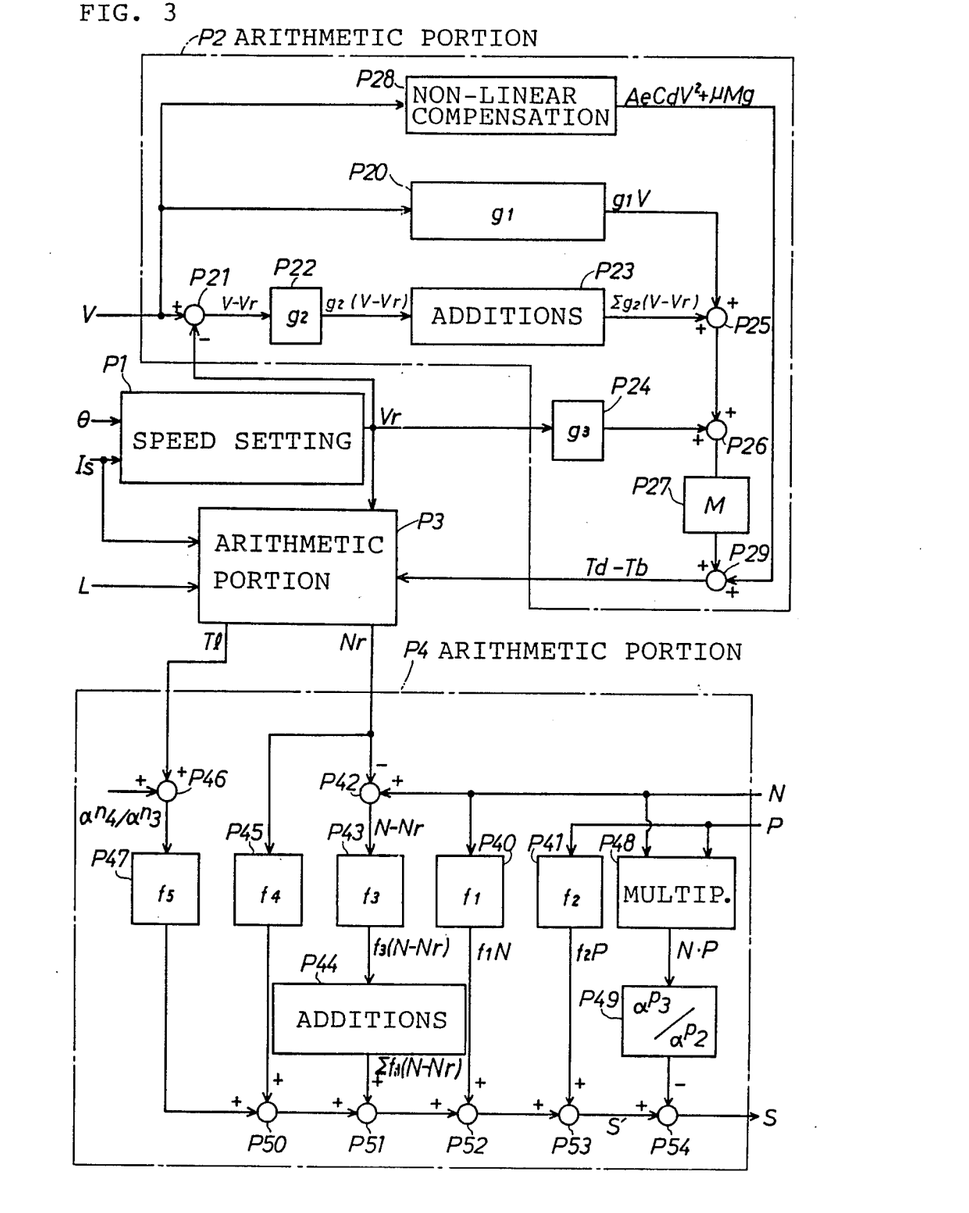
FIG. 3 is a block diagram of the control system of the speed control system shown in FIG. 2.

A control system for controlling the vehicle speed under the control of the electronic controller 42 is next described by referring to the block diagram of FIG. 3, which does not show any hardware. In practice, the control system is realized as a discrete system by executing a series of programs shown in the flowcharts of FIGS. 4A and 4B.

As shown in FIG. 3, a speed control system according to the invention comprises a speed-setting portion P1 and arithmetic portions P2, P3, and P4. The setting portion P1 sets the target velocity Vr of the vehicle according to both the distance $\theta$ moved by the accelerator pedal 14 and the gear position Is of the transmission 18. The distance $\theta$ is detected by the accelerator sensor 40, and the gear position Is is detected by the gear position sensor 28. The arithmetic portion P2 calculates from the set target velocity Vr and the actual velocity V detected by the speed sensor 38 a driving torque which is obtained at the output of the transmission 18, i.e., at the driving wheels 24, which is needed to bring the actual velocity V to the target velocity Vr.

The driving torque is equal to the tire-driving torque Td minus the braking torque Tb. The arithmetic portion P3 calculates the rotational speed Nr of the engine 2 which makes the actual velocity V coincident with the target velocity Vr, from the target velocity Vr set by the setting portion P1, the gear position Is of the transmission 18 detected by the gear position sensor 28, and the distance L moved by the clutch pedal 30, which is detected by the clutch sensor 32. The arithmetic portion P3 also computes the torque Tl imposed on the engine 2 at this time. The arithmetic portion P4 further calculates the throttle opening S needed to bring the engine speed N to the target speed Nr, from the target speed Nr and the load torque Tl calculated by the arithmetic portion P3, from the engine speed N detected by the engine speed sensor 34, and from the intake pressure P detected by the intake pressure sensor 12.

The vehicle speed-setting portion P1 corresponds to the target vehicle speed determining means M1 already described in conjunction with FIG. 1. This setting portion P1 sets the target velocity Vr of the vehicle according to the graph of FIG. 5, where the target velocity Vr is plotted against the distance $\theta$ moved by the accelerator pedal 14, for all the gear positions Is of the transmission 18.

The arithmetic portion P2 for calculating the driving torque corresponds to the aforementioned first calculation means M6. The arithmetic portion P2 calculates the driving torque (Td−Tb) using parameters which are set according to a state equation describing the behavior of the vehicle. This equation includes the vehicle velocity as a state variable.

More specifically, the arithmetic portion P2 first multiplies the vehicle velocity V by a coefficient g1 (P20), and calculates the difference between the velocity V and the target velocity Vr (P21). The difference (V−Vr) is multiplied by a coefficient g2 (P22). Various values of the product g2·(V−Vr) then are added up (P23). The target velocity Vr is multiplied by a coefficient g3 (P24). The product g1·V obtained at P20 next is added to the sum $\Sigma$g2·(V−Vr) obtained at P23 (P25). The resulting sum is added to the product g3·Vr obtained at P24 (P26). The resultant sum is multiplied by the weight M of the vehicle (P27). Meanwhile, a compensating value (Ae·Cd·V$^2$+$\mu$·M·g) (to be described below) is calculated from the vehicle velocity V to compensate for the nonlinearity (P28). This compensating value is added to the product calculated at P27 (P29) to obtain the driving torque (Td−Tb).

The arithmetic portion P3 for calculating the target speed Nr and the torque Tl corresponds to the above-described second calculation means M7. The engine speed Nr is required to render the actual velocity V coincident with the target speed Vr, and the torque Tl is imposed on the engine 2 at this time. The arithmetic portion P3 calculates the two values from the gear position Is of the transmission 18 and the distance L moved by the clutch pedal, i.e., the state of the transmission 18, using an equation (described later) which has been previously determined, depending on the characteristics of the power train between the engine 2 and the driving wheels 24.

The arithmetic portion P4 corresponds to the control parameter calculation means M8 mentioned previously. The arithmetic portion P4 calculates the throttle opening S necessary to bring the engine speed N to the target speed Nr, using parameters which are set according to a state equation representing the behavior of the engine. The equation includes the engine speed N and the intake pressure P as state variables.

Specifically, the arithmetic portion P4 first multiplies the engine speed N by a coefficient f1 (P40). Also, it multiplies the intake pressure P by a coefficient f2 (P41). The difference between the actual engine speed N and the target engine speed Nr is calculated (P42). Then, the difference (N−Nr) is multiplied by a coefficient f3 (P43). Various values of the product f3·(N−Nr) are then summed up (P44). Also, the target vehicle speed Nr is multiplied by a coefficient f4 (P45). A constant $\alpha n_4/\alpha n_3$ also is added to the load torque Tl (P46). The sum is multiplied by a coefficient f5 (P47). The product of the engine speed N and the intake pressure P is also calculated (P48), and the obtained product is multiplied by a constant $\alpha p_3/\alpha p_2$ (P49). The product obtained at P47 is added to the product calculated at P45 (P50). The sum is added to the sum calculated at P44 (P51). Then, the product derived at P40 is added to the sum calculated at P51 (P52). The product obtained at P41 is added to the sum calculated at P52 (P53). The product calculated at P49 then is subtracted from the sum obtained at P53 (P54) to calculate the throttle opening S.

A method of designing the control system shown in FIG. 3 is next described. A method of designing a control system of this kind is described in detail, for example, in David G. Luenberger's "Introduction to Dynamic System—Theory, Models and Applications", John Wiley & Sons, Inc., New York. Therefore, the method is described only briefly herein. In this example, the Smith-Davison method of design is used.

A physical model which describes the behavior of the engine 2 and provides the basis for the arithmetic portion P4 for controlling the engine speed is now described. An equation of motion for the engine 2 that is running is given by:

$$dN/dt = (1/I) \cdot \left[ \sum_{i=1}^{n} (Pci - Pa) \cdot (dVci/d\omega) - Tf - Tl \right] \quad (1)$$

where N is the engine speed, t is time, I is the moment of inertia of the rotating portion of the engine, n is the number of cylinders, Pci is the pressure inside the i-th cylinder, Pa is the atmospheric pressure, $\omega$ is the crank angle, Vci is the volume of the i-th cylinder, Tf is the torque due to mechanical loss, and Tl is the actual load torque.

The law of conservation of mass for the flow of air admitted into the cylinder of the engine 2 which is in the suction stroke is given by:

$$dP/dt = (C^2/V) \cdot \left[ m - \sum_{i=1}^{n} \{(Kc/(Kc-1)) \cdot P \cdot (dVci/dt) - qm\}/\{(Ki/(Ki-1)) \cdot Ri \cdot Ti\}^* \right] \quad (2)$$

where P is the suction pressure, or the pressure inside the suction pipe, C is the sonic velocity, m is the flow of air admitted into the combustion chamber through the throttle valve, Kc is the ratio of specific heat of the air-fuel mixture, qm is the flow of heat transmitted through the wall of each cylinder, Ki is the ratio of specific heat of admitted air, Ri is the gas constant of the admitted air, Ti is the temperature of the admitted air, and V is the volume of the admitted air. The asterisked term is zero except during the suction stroke.

Since the torque is approximately proportional to the intake pressure P, equation (1) can be approximated by:

$$(1/I) \cdot \left[ \sum_{i=1}^{n} (Pci - Pa) \cdot (dVci/d\omega) \right] = \alpha n_1 \cdot P \tag{3}$$

If the pressure Pci inside the cylinder is lower than a critical pressure, then the flow of the admitted air is in proportion to the effective cross-sectional area of the suction throttle, or the throttle opening. Therefore, equation (2) can be approximated by:

$$(C^2/V) \cdot m = \alpha^{p}1 \cdot S \tag{4}$$

Since the flow of air admitted into the cylinder is proportional to the product of the engine speed N and the intake pressure P, equation (2) can be approximated by:

$$-(C^2/V) \cdot \left[ \sum_{i=i}^{n} \{(Kc/(Kc - 1)) \cdot P \cdot (dVci/dt) - gm\}/\{(Ki/(Ki - 1)) \cdot Ri \cdot Ti\}* \right] = \alpha p2 \cdot P \cdot N \tag{5}$$

Using equations (3), (4), (5), equations (1) and (2) can be approximated by:

$$dN/dt = \alpha^n 1 \cdot i - \alpha^n 2 \cdot Tf - \alpha^n 3 \cdot Tl \tag{6}$$

$$dP/dt = \alpha^p 1 \cdot s + \alpha^p 2 \cdot P \cdot N \tag{7}$$

Equations (6) and (7) are subjected to being made discrete by Euler's method or integration. Also, the approximation that the torque Tf due to the mechanical loss is proportional to the engine speed N is made. Then, the coefficients are modified to obtain:

$$N(k+1) = \alpha^n 1 \cdot N(k) + \alpha^n 2 \cdot P(k) + \alpha^n 3 \cdot Tl(k) + \alpha^n 4 \tag{8}$$

$$P(k+1) = \alpha^p 1 \cdot P(k) + \alpha^p 2 \cdot S(k) + \alpha^p 3 \cdot P(k) \cdot N(k) \tag{9}$$

which are identifying fundamental equations when a sampling process is effected for a given period.

To obtain the term including the load torque Tl(k), the term $\alpha^n 3 \cdot Tl(k)$ including the real load torque and the constant term $\alpha^n 4$ are interrelated by:

$$\alpha^n 3 \cdot T(k) = \alpha^n 3 \cdot \{Tl(k) + (\alpha^n 4/\alpha^n 3)\} \tag{10}$$

The throttle opening S(k) that is a controlled variable is converted into a controlled amount S'(k) as follows:

$$S'(k) = S(k) + (\alpha^p 3/\alpha^p 2) \cdot P(k) \cdot N(k) \tag{11}$$

The constant terms of equations (8) and (9) are identified by the least squares method. Equations (8) and (9) are also linearized using equations (10) and (11) to give rise to a state equation and an output equation which are given by equations (12) and (13), respectively, as follows:

$$\begin{bmatrix} N(k+1) \\ P(k+1) \end{bmatrix} = \begin{bmatrix} \alpha^n 1 & \alpha^n 2 \\ 0 & \alpha^p 1 \end{bmatrix} \cdot \begin{bmatrix} N(k) \\ P(k) \end{bmatrix} + \begin{bmatrix} 0 \\ \alpha^p 2 \end{bmatrix} \cdot S'(k) + \begin{bmatrix} \alpha^n 3 \\ 0 \end{bmatrix} \cdot T(k) \tag{12}$$

$$\begin{bmatrix} N(k) \\ P(k) \end{bmatrix} = \begin{bmatrix} 1 & 0 \\ 0 & 1 \end{bmatrix} \cdot \begin{bmatrix} N(k) \\ P(k) \end{bmatrix} \tag{13}$$

In this way, a dynamic physical model is represented by equations (12) and (13). This model is a desired linearization of the nonlinear engine 2.

The arithmetic portion P4 for controlling the engine speed is designed according to such a physical model. It is first assumed that the target engine speed Nr changes in a stepwise fashion. The difference e(k) between the actual engine speed N(k) and the target engine speed Nr is now introduced. The difference is given by:

$$e(k) = N(k) - Nr \tag{14}$$

The system represented by equation (12) is extended to a servo system. An increment $\Delta e(k)$ of the difference e(k) is taken, assuming that the target speed Nr varies in a stepwise manner. Then, we have the relation:

$$\Delta e(k) = e(k) - e(k-1) = \Delta N(k) - \Delta Nr = \Delta N(k) \tag{15}$$

Accordingly, the difference e(k) is given by:

$$e(k) = \Delta N(k) + e(k-1) \tag{16}$$

By expressing the system extended to the servo system in terms of increment values by the use of equations (12) and (16), the following state equation is derived:

$$\begin{bmatrix} \Delta N(k+1) \\ \Delta P(k+1) \\ e(k) \end{bmatrix} = \begin{bmatrix} \alpha^n 1 & \alpha^n 2 & 0 \\ 0 & \alpha^p 1 & 0 \\ 1 & 0 & 1 \end{bmatrix} \cdot \begin{bmatrix} \Delta N(k) \\ \Delta P(k) \\ e(k-1) \end{bmatrix} + \begin{bmatrix} 0 \\ \alpha^p 2 \\ 0 \end{bmatrix} \cdot S'(k) \tag{17}$$

Equation (17) can be expressed as follows:

$$\delta X(k+1) = Pa \cdot \delta X(k) + Ga \cdot \delta u(k) \tag{18}$$

Then, we obtain an evaluation function of discrete quadratic form given by:

$$J = \sum_{k=0}^{\infty} [\delta X^T(k) \cdot Q \cdot \delta X(k) + \delta u^T(k) \cdot R \cdot \delta u(k)] \tag{19}$$

The weighted parameter matrices Q and R are selected. The input $\delta u(k)$ which minimizes the evaluation function J is given by:

$$\delta u(k) = F' \cdot \delta X(k) \quad (20)$$

Therefore, the optimum feedback gain F' is represented by:

$$F' = -(R + Ga^T \cdot M \cdot Ga)^{-1} \cdot Ga^T \cdot M \cdot Pa \quad (21)$$

where M is a regular symmetric matrix satisfying the discrete Riccati's equation given by:

$$M = Pa^T \cdot M \cdot Pa + Q - (Pa^T \cdot M \cdot Ga) \cdot \quad (22)$$

$$(R + Ga^T \cdot M \cdot Ga)^{-1} \cdot (Ga^T \cdot M \cdot Pa)$$

Thus, the increment $\Delta S'(k)$ of the controlled amount is given by:

$$\Delta S'(k) = F \cdot \begin{bmatrix} \Delta N(k) \\ \Delta P(k) \end{bmatrix} + f \cdot e(k-1) \quad (23)$$

where $F' = [F\ f]$. More specifically, this is equal to [f1 f2 f3].

By integrating formula (23), the controlled amount $S'(k)$ is given by:

$$S'(k) = f1 \cdot N(k) + f2 \cdot P(k) + \sum_{j=0}^{N-1} f3 \cdot e(j) + c \quad (24)$$

Feedforward of the target engine speed Nr and the load torque T(k) is provided with respect to the constant c included in equation (24). For this purpose, the constant c is defined as:

$$c = Ff(Nr, T(k)) \quad (25)$$

Ff in equation (25) is so set that $$\sum_{j=1}^{N-1} f3 \cdot e(j)$$

included in equation (24) is equal to null and N(k) is equal to Nr. In extreme conditions, parameters are represented by the subscript r. Then, we have:

$$S'r = f1 \cdot Nr + f2 \cdot Pr + Ff(Nr, T(k)) \quad (26)$$

From equation (12), we have the equation:

$$\begin{bmatrix} Nr \\ Pr \end{bmatrix} = \begin{bmatrix} \alpha^{n1} & \alpha^{n2} \\ 0 & \alpha^{p1} \end{bmatrix} \cdot \begin{bmatrix} Nr \\ Pr \end{bmatrix} + \begin{bmatrix} 0 \\ \alpha^{p2} \end{bmatrix} \cdot S'r + \begin{bmatrix} \alpha^{n3} \\ 0 \end{bmatrix} \cdot T(k) \quad (27)$$

Substituting equation (26) into equation (27) gives rise to:

$$\left[ I - \begin{bmatrix} \alpha^{n1} & \alpha^{n2} \\ 0 & \alpha^{p1} \end{bmatrix} - \begin{bmatrix} 0 \\ \alpha^{p2} \end{bmatrix} \cdot [f1\ f2] \right] \cdot \begin{bmatrix} Nr \\ Pr \end{bmatrix} = \quad (28)$$

$$\begin{bmatrix} 0 \\ \alpha^{p2} \end{bmatrix} \cdot Ff(Nr, T(k)) + \begin{bmatrix} \alpha^{n3} \\ 0 \end{bmatrix} \cdot T(k)$$

Then $$\theta = [1\ 0] \quad (29)$$

and $$\Lambda = \left[ I - \begin{bmatrix} \alpha^{n1} & \alpha^{n2} \\ 0 & \alpha^{p1} \end{bmatrix} - \begin{bmatrix} 0 \\ \alpha^{p2} \end{bmatrix} \cdot [f1\ f2] \right]^{-1} \quad (30)$$

From equation (30), it follows that:

$$Nr = \theta \cdot \begin{bmatrix} Nr \\ Pr \end{bmatrix} = \theta \cdot \Lambda^{-1} \cdot \begin{bmatrix} 0 \\ \alpha^{p2} \end{bmatrix} \cdot Ff(Nr, T(k)) + \quad (31)$$

$$\theta \cdot \Lambda^{-1} \cdot \begin{bmatrix} \alpha^{n3} \\ 0 \end{bmatrix} \cdot T(k)$$

From equation (31), we get:

$$Ff(Nr, T(k)) = \left[ \theta \cdot \Lambda^{-1} \cdot \begin{bmatrix} 0 \\ \alpha^{p2} \end{bmatrix} \right]^{-1} \cdot Nr - \quad (32)$$

$$\left[ \theta \cdot \Lambda^{-1} \cdot \begin{bmatrix} 0 \\ \alpha^{p2} \end{bmatrix} \right]^{-1} \cdot \theta \cdot \Lambda^{-1} \cdot \begin{bmatrix} \alpha^{n3} \\ 0 \end{bmatrix} \cdot T(k)$$

In equation (32), the first term represents the feedforward control of the target engine speed. The second term expresses the feedforward of the load torque. We now rewrite the first and econd terms as f4·Nr and f5·T(k), respectively. From equations (15) and (24), the controlled amount $S(k)'$ is given by:

$$S(k)' = f1 \cdot N(k) + f2 \cdot P(k) + \Sigma f3(N(k) - Nr) + \quad (33)$$
$$f4 \cdot Nr + f5 \cdot T(k)$$

Therefore, from equations (10) and (11), the throttle opening S(k) is given by $$S(k) = f1 \cdot N(k) + f2 \cdot P(k) + \Sigma f3 \cdot (N(k) - Nr) + \quad (34)$$
$$f4 \cdot Nr + f5 \cdot (Tl(k) + \alpha^{n4}/\alpha^{n3}) -$$
$$(\alpha^{p3}/\alpha^{p2}) \cdot P(k) \cdot N(k)$$

Thus, the control system of the arithmetic portion P4 for controlling the engine speed can be designed.

The physical model on which the arithmetic portion P2 for calculating the driving torque is based is now described. An equation of motion describing the behavior of a vehicle that is running is given by:

$$M \cdot dV/dt = Td - Tb - (Ae \cdot Cd \cdot V^2 + \mu \cdot M \cdot g) \quad (35)$$

where M is the mass of the vehicle (in Kg), V is the velocity of the vehicle (in m/sec), Td is the torque driving the tires (in N·m), Tb is the braking torque (in N·m), Ae is the frontal projected area of the vehicle (in m²), Cd is the drag coefficient, $\mu$ is the coefficient of rolling friction, and g is the gravitational acceleration (in m/sec²). The following equation is introduced:

$$u = (Td - Tb)/M - (Ae \cdot Cd \cdot V^2 + \mu \cdot M \cdot g)/M \qquad (36)$$

Using this relation, equation (35) is modified in the form of $$dV/dt = u \qquad (37)$$

By subjecting equation (37) to being made discrete with $\Delta t$, we have:

$$V(k+1) = V(k) + \Delta t \cdot u(k) \qquad (38)$$

In this way, a dynamic physical model for the vehicle is constructed.

Let Vr be the target vehicle speed. The discrete Riccati's equation is solved in the same manner as in the control system for the engine 2 to obtain a control law for causing the actual vehicle speed to follow the target speed Vr. The control law is given by:

$$u(k) = g1 \cdot V(k) + \Sigma g2 \cdot (V(k) - Vr) + g3 \cdot Vr \qquad (39)$$

From equation (36), the driving torque (Td−Tb) transmitted to the wheels is expressed by $$Td - Tb = M \cdot u(k) + (Ae \cdot Cd \cdot V^2 + \mu \cdot M \cdot g) \qquad (40)$$

The torque (Td−Tb) has been compensated for nonlinearity by $(Ae \cdot Cd \cdot V^2 + \mu \cdot M \cdot g)$. Hence, the arithmetic portion P2 for calculating the driving torque can be designed.

The arithmetic portion P3 for calculating the target engine speed and the load torque is now described. As mentioned previously, rotary motion produced by the engine 2 is transmitted to the driving wheels 24 via the transmission 18, the propeller shaft 20, and the differential gear 22. The torque Td (in N·m) that the driving wheels 24 receive from the engine via the power train is given by:

$$Td = Ce \cdot Dt \cdot Dd \cdot Tl \qquad (41)$$

where Ce is the power transmission efficiency of the power train, Dt is the reduction gear ratio of the transmission 18, Dd is the reduction gear ratio of the differential gear 22, and Tl (in N·m) is the torque imposed on the engine 2. The vehicle velocity (in m/sec) can be expressed by $$V = Rt \cdot Dt \cdot Dd \cdot N \cdot \pi / 30 \qquad (42)$$

where Rt (in m) is the effective radius of the tires, Dt is the reduction gear ratio of the transmission 18, Dd is the reduction gear ratio of the differential gear 22, and N (in r.p.m.) is the engine speed.

When the driving torque (Td−Tb) which is transmitted to the driving wheels 24 and calculated by the arithmetic portion P2 is in excess of 0, it is assumed that Tb =0. This means that the driving torque comes totally from the engine 2. Conversely, when the load torque (Td−Tb) is negative, the brake system bears the driving torque.

When the driving torque (Td−Tb) is in excess of zero, the torque Tl imposed on the engine is calculated using equation (41). Thus, $$Tl = Td/(Ce \cdot Dt \cdot Dd) \qquad (43)$$

When the driving torque (Td−Tb) is negative, Tl=0. At this time, the target engine speed Nr is computed using equation (42). Thus, $$Nr = 30 Vr / Rt \cdot Dt \cdot Dd \qquad (44)$$

The transmission efficiency Ce and the reduction gear ratio Dt of the transmission 18 change, depending on the gear position Is of the transmission 18. The arithmetic portion P3 thus stores values of the transmission efficiency Ce and the reduction gear ratio Dt for every gear position Is of the transmission 18. When the driving torque calculated by the arithmetic portion P2 exceeds 0, the arithmetic portion P3 calculates the torque Tl imposed on the engine from the values of the efficiency Ce and the ratio Dt corresponding to the gear position Is using equation (43). When the driving torque is negative, it sets the load torque Tl equal to 0. Similarly, the target engine speed Nr is calculated from the value of the reduction gear ratio Dt corresponding to the gear position Is using equation (44).

When the transmission 18 is in its neutral position, or when the driver pushes down on the clutch pedal 30 to disengage the transmission 18 from the engine 2, no load is applied to the engine 2. In this case, the load torque Tl is set equal to 0 even if the driving torque is in excess of 0. When the transmission 18 is in its neutral position, the target engine speed Nr is maintained at a predetermined value Nidl to retain the actual engine speed at a given idling speed in the same manner as in the conventional vehicle.

Figure 4A:
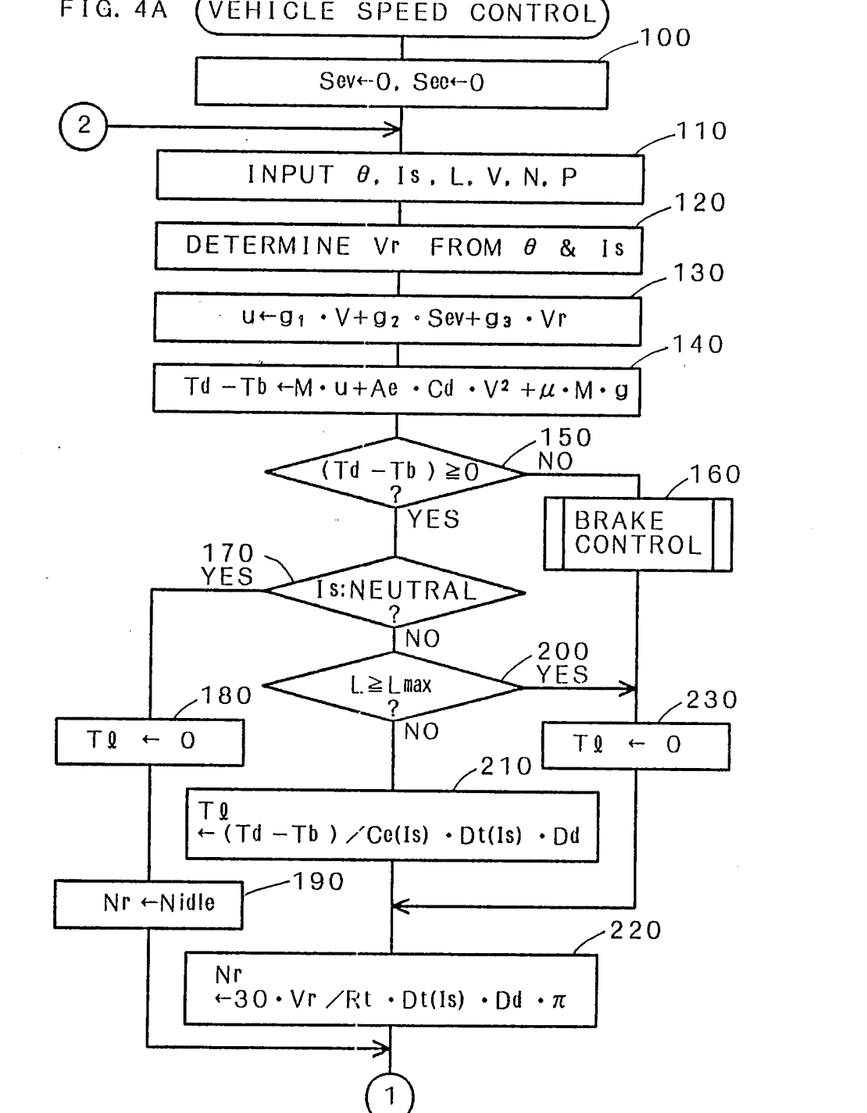
FIGS. 4A and 4B are flowcharts for illustrating a series of operations performed to control the vehicle speed.
Figure 4B:
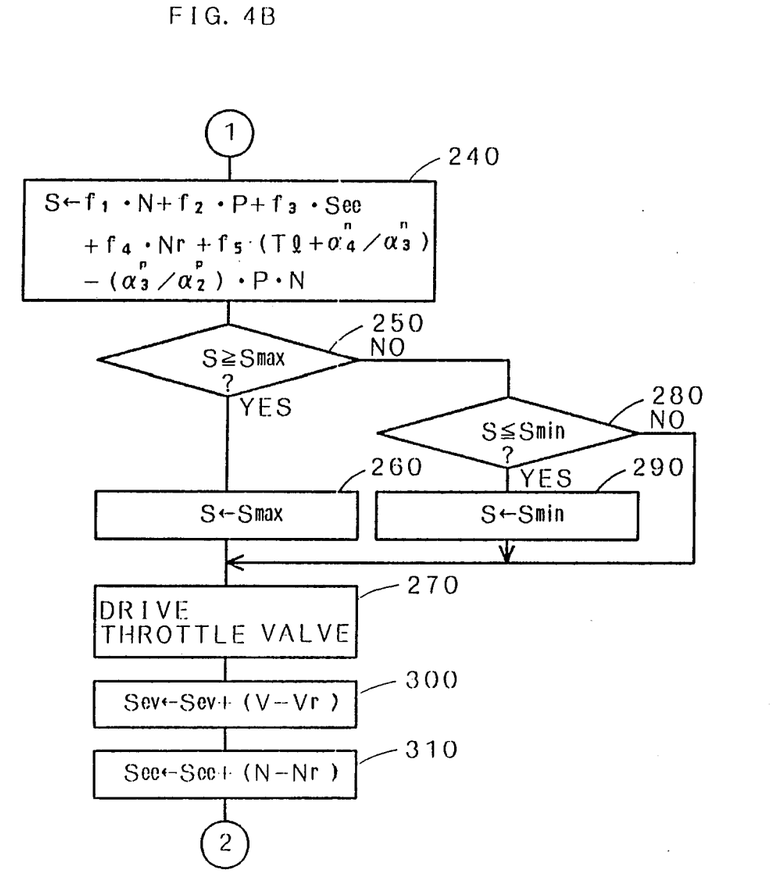

A series of operations performed by the electronic controller 12 to control the vehicle velocity is next described by referring to the flowchart of FIG. 4. The process for controlling the velocity begins with the start of the engine 2, and is repeatedly carried out during the running of the engine 2. When the process is initiated, the difference between the actual vehicle velocity V and the target vehicle velocity Vr is calculated and then integrated, obtaining a value Sev. The difference between the actual engine speed N and the target engine speed Nr is calculated and integrated, resulting in a value See. These two values Sev and See are initialized at 0 (step 100).

The control then goes to step 110, where the gear position Is of the transmission 18, the distance $\theta$ moved by the accelerator pedal 14, the distance L moved by the clutch pedal 30, the vehicle velocity V, the engine speed N, and the intake pressure P are determined from the output signals from the sensors.

Figure 5:
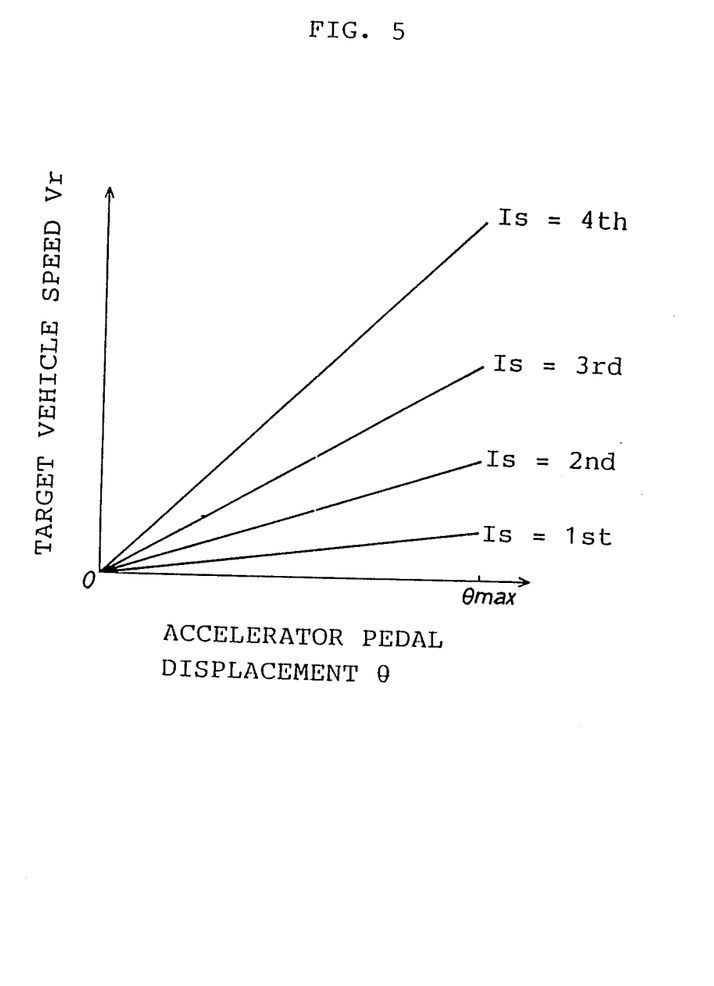
FIG. 5 is a graph in which set speed Vr is plotted against the displacement $\theta$ of the accelerator pedal for four speeds.

The control then goes to step 120, where the target vehicle velocity Vr is calculated from the graph shown in FIG. 5 according to the determined distance $\theta$ moved by the accelerator pedal 14 and the gear position Is of the transmission 18.

Subsequently, the control goes to step 130, where the controlled amount u(k) is calculated using equation (39) to compute the torque that drives the driving wheels 24. Equation (39) includes as parameters the calculated target vehicle velocity Vr, the actual vehicle velocity V, and the values Sev obtained by integrating the difference between the velocity V and the target velocity Vr. Thereafter, the driving torque (Td−Tb) is calculated, using equation (40) and the calculated controlled amount u(k) (step 140).

A decision next is made to see whether the calculated driving torque is in excess of 0 or not, i.e., whether the driving torque is controlled by the engine 2 or by the brake system as mentioned previously (step 150). If the driving torque is negative, then the control proceeds to step 160, where the brake system (not shown) of the vehicle is actuated in response to the driving torque.

If the driving torque is found to be larger than 0 at step 150, on the other hand, then the control goes to step 170, where a decision is made to ascertain whether the transmission 18 is in its neutral position based on the detected gear position Is of the transmission 18.

If the transmission 18 is in its neutral position, the control goes to step 180, where the torque Tl imposed on the engine 2 is set equal to 0. Then, the target engine speed Nr is set to the preset idling speed Nidle, say 650 r.p.m (step 190).

If the result of the decision made at step 170 is that the transmission 18 is not in its neutral position, then the control proceeds to step 200, where a decision is made to see if the distance L moved by the clutch pedal 30 exceeds a given value Lmax capable of disconnecting the transmission 18 from the engine 2. If the result of the decision is that the distance L is less than Lmax, indicating that the clutch is not disengaged, then the control goes to step 210, where the values of the reduction gear ratio Dt of the transmission 18 and the transmission coefficient Ce which correspond to the gear position Is of the transmission 18 are fetched. The torque Tl imposed on the engine 2 is calculated from these values and from the driving torque Td−Tb, i.e., Td (calculated at step 140), on the side of the driving wheels 24, using equation (43). The control then goes to step 220.

If the result of the decision is that L is larger than or equal to Lmax, indicating that the clutch is let out, then the control proceeds to step 230, where the torque Tl imposed on the engine 2 is set to 0, followed by shift of the control to step 220. Also when the brake system is actuated at step 160, step 230 is carried out, after which the control goes to step 220.

At step 220, the target engine speed Nr is calculated from the reduction gear ratio Dt of the transmission 18 and from the target vehicle velocity Vr set at step 120, employing equation (44). The gear ratio Dt is obtained, corresponding to the gear position Is of the transmission 18.

After the torque Tl imposed on the engine 2 and the target engine speed Nr are set in this way, step 240 is effected to calculate the throttle opening S, using equation (34), from the set torque T{and target speed Nr, the engine speed N and the intake pressure P determined at step 110, and the value See obtained by integrating the difference between the actual engine speed N and the target engine speed Nr.

A decision then is made to see whether the throttle opening S is larger than the maximum value Smax, i.e., whether it can be controlled by the stepper motor 16 (step 250). If the relation S≧Smax holds, then the control proceeds to step 260, where the throttle opening S is set to the maximum value Smax. Then, the control goes to step 270.

If the result of the decision made at step 250 is that S<Smax, on the other hand, then the control advances to step 280, where a decision is made to determine whether the calculated throttle opening S is less than the minimum value Smin below which the motor 16 can no longer control the throttle. If the relationship S≦Smin holds, then the control goes to step 290, where the throttle opening S is set to the minimum value Smin. Subsequently, the control proceeds to step 270. If S is larger than Smin, then the control goes directly to step 270 from step 280.

At step 270, a signal is fed to the stepper motor 16 so that the motor may drive the throttle valve 8 in such a way that its opening becomes equal to the throttle opening S calculated at step 240, 260, or 290. After the completion of the actuation, the control goes to step 300, where the newly calculated difference between the actual vehicle velocity V and the target velocity Vr is added to the value Sev obtained by integration to renew the value Sev. Then, the control goes to step 310, where the newly calculated difference between the engine speed N and the target engine speed Nr is added to the value See derived by integration, thus updating the value See. Subsequently, the control goes back to step 110.

As can be understood from the description thus far made, the driving torque which is obtained at the driving wheels and necessary to bring the actual vehicle velocity to the target velocity is calculated according to the control law that is determined, based on the physical model describing the behavior of the vehicle. The vehicle velocity is taken as a state variable. Also, the throttle opening for the engine is calculated according to the control law which is determined based on the physical model representing the behavior of the engine. In that model, the engine speed and the intake pressure are taken as state variables.

Figure 6:
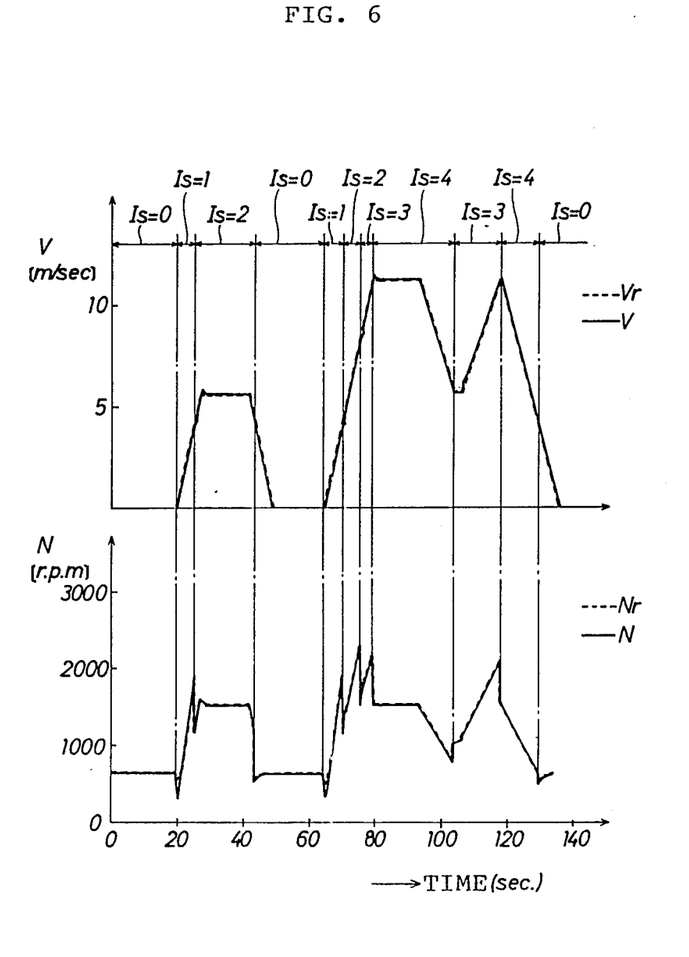
FIG. 6 is a graph showing the actual speed of the vehicle which is under the control of the speed control system according to the embodiment.

Therefore, as shown in FIG. 6, the engine speed is well controlled in response to the target engine speed without delay. As a result, the actual vehicle velocity follows the target velocity without delay. When the transmission is shifted to another gear position to thereby quickly vary both the torque imposed on the engine and the engine speed, a delay would be introduced in the response of the conventional feedback control system. In the present example, however, no delay occurs in the response, because the control system for the engine provides feedforward of the load torque and the engine speed. Hence, the vehicle speed can be controlled better than heretofore. FIG. 6 shows the results of a simulation of a vehicle which is equipped with the speed control system of the above example and run in 10 different modes.

Since the control systems of the present invention are designed for the vehicle, the power train of the vehicle, and the engine, respectively, it is easy to design the whole speed control system. When the design is modified, it is only necessary to amend the control law for the modified portion. Consequently, the control systems of the speed control system can be standardized.

The control systems for the vehicle and the engine are designed according to physical models describing the behavior of the vehicle and the engine, respectively. In prior art systems based on the assumption that a linear relation holds between the control input and the control output and which has established control laws, it is necessary to switch one control law to another whenever the vehicle or engine goes into a different region where an approximation is made using a linear relationship. Unlike such systems, the novel speed control system of the present invention is able to control the vehicle speed with only one program over the whole running range. Therefore, the control program can be simplified.

What is claimed is:

1. A speed control system for a vehicle having an internal combustion engine, an output power thereof is adjusted by a throttle valve and is transmitted via a transmission to a driving wheel in order to control a vehicle speed, the control system comprising:
   target speed determination means for determining a target vehicle speed based on at least a command from a driver of the vehicle;
   first calculation means responsive to an actual vehicle speed and the target vehicle speed for calculating a driving torque at an output side of the transmission necessary to bring the actual vehicle speed to the target vehicle speed utilizing predetermined first parameters, the first parameters being determined based on a first physical model describing the behavior of the vehicle utilizing the vehicle speed as a state variable;
   second calculation means responsive to the driving torque, the target vehicle speed and a gear position of the transmission for calculating a target rotational speed and a load torque of the engine;
   control amount calculation means responsive to the target rotational speed, the load torque, an actual rotational speed of the engine and an intake air pressure of the engine for calculating a control amount of the throttle valve necessary to bring the actual rotational speed of the engine to the target rotational speed utilizing predetermined second parameters, the second parameters being determined based on a second physical model describing the behavior of the engine utilizing said actual rotational speed of the engine and said intake air pressure of the engine as state variables; and
   throttle driving means responsive to the control amount for driving the throttle valve of the internal combustion engine.

2. A speed control system according to claim 1, wherein the target speed determination means determines the target vehicle speed Vr based on an accelerator pedal displacement $\theta$ and the gear position Is of the transmission.

3. A speed control system according to claim 1, wherein the first calculation means calculates the driving torque Td−Tb from the following equation:

$$Td - Tb = M \cdot (g1 \cdot V + \Sigma g2 \cdot (V - Vr) + g3 \cdot Vr) + (Ae \cdot Cd \cdot V^2 + \mu \cdot M \cdot g),$$

where M is a mass of the vehicle, V is the actual vehicle speed, Vr is the target vehicle speed, Ae is a front projected area of the vehicle, Cd is a drag coefficient, $\mu$ is a rolling resistance coefficient, g is the acceleration of gravity and g1, g2 and g3 are parameters determined from the first physical model.

4. A speed control system according to claim 1, wherein the second calculation means calculates the target rotational speed Nr and the load torque Tl of the engine from the folowing equations:

$$Nr = c \cdot Vr/(Rt \cdot Dt \cdot Dd) \text{ and}$$

$$Tl = Td/(Ce \cdot Dt \cdot Dd),$$

where Vr is the target vehicle speed, Rt is an effective radius of the driving wheel, Dt is a reduction ratio of the transmission, Dd is a reduction ratio of a differential, Td is the driving torque calculated by the first calculation means, Ce is a transmission efficiency and c is a coefficient.

5. A speed control system according to claim 4, wherein the second calculation means determines the load torque Tl to be 0 and actuates a brake system of the vehicle when the driving torque calculated by the first calculation means is less than 0.

6. A speed control system according to claim 4, wherein the second calculation means determines the target rotational speed of the engine to be a predetermined idling speed of the engine and the load torque Tl to be 0 when the gear position of the transmission is in neutral.

7. A speed control system according to claim 4, wherein the second calculation means determines the load torque Tl to be 0 when a clutch of the vehicle is disengaged.

8. A speed control system according to claim 1, wherein the control amount calculation means calculates the control amount S from the following equation:

$$S = f1 \cdot N + f2 \cdot P + \Sigma f3 \cdot (N - Nr) + f4 \cdot Nr + f5 \cdot (Tl + \alpha^{n4}/\alpha^{n3}) - (\alpha^{p3}/\alpha^{p2}) \cdot P \cdot N$$

where N is the actual rotational speed of the engine, P is the intake air pressure of the engine, Nr is the target rotational speed of the engine, Tl is the load torque, and f1, f2, f3, f4, f5, $\alpha^{n4}/\alpha^{n3}$ and $\alpha^{p3}/\alpha^{p2}$ are parameters determined from the second physical model.

* * * * *